United States Patent [19]

Dehennau et al.

[11] Patent Number: 5,028,476

[45] Date of Patent: Jul. 2, 1991

[54] COEXTRUDED RIGID THERMOPLASTIC STRUCTURES ENABLING BIAXIALLY ORIENTED MATERIALS TO BE OBTAINED

[75] Inventors: Claude Dehennau, Waterloo; Paul Dubois, Ath, both of Belgium

[73] Assignee: Solvay & Cie., Brussels, Belgium

[21] Appl. No.: 383,055

[22] Filed: Jul. 21, 1989

[30] Foreign Application Priority Data

Jul. 21, 1988 [FR] France .................. 88 09995

[51] Int. Cl.$^5$ .................................. B32B 27/08
[52] U.S. Cl. .................... 428/213; 428/518; 428/520; 428/910
[58] Field of Search .......... 428/518, 520, 910, 913, 428/213

[56] References Cited

U.S. PATENT DOCUMENTS

| | | | |
|---|---|---|---|
| 4,223,054 | 9/1980 | Schramer et al. | 428/518 |
| 4,230,768 | 10/1980 | Hamada et al. | 428/352 |
| 4,320,174 | 3/1982 | Rabinovitch et al. | 428/518 |

FOREIGN PATENT DOCUMENTS

| | | |
|---|---|---|
| 2536461 | 2/1977 | Fed. Rep. of Germany . |
| 1571391 | 3/1968 | France . |
| 7703828 | 9/1977 | France . |

*Primary Examiner*—James J. Seidleck
*Attorney, Agent, or Firm*—Spencer & Frank

[57] ABSTRACT

Biaxially oriented rigid thermoplastic structures with multiple coextruded polymeric layers comprising a layer of vinyl chloride polymer and a coating layer of polymethyl methacrylate containing products absorbing ultraviolet radiation. The content of products absorbing ultraviolet radiation is such that the glass transition temperature of the coating layer does not exceed 105° C., thus permitting an orientation in the range 95°–110° C.

8 Claims, No Drawings

COEXTRUDED RIGID THERMOPLASTIC STRUCTURES ENABLING BIAXIALLY ORIENTED MATERIALS TO BE OBTAINED

BACKGROUND OF THE INVENTION

1. Field of the Invention

The present invention relates to biaxially oriented rigid thermoplastic structures comprising a layer of vinyl chloride polymer and a coating layer of polymethyl methacrylate containing products absorbing ultraviolet radiation.

2. Background of the Related Art

It is known to manufacture, starting with thermoplastic resins such as vinyl chloride polymer (PVC, and the like), finished objects exhibiting improved mechanical characteristics by orienting the macromolecules in one direction or in two directions at right angles. A major increase in rigidity and in impact strength is observed, proportional to the orientation produced.

It is also known, especially from French Patent FR-A-1,571,391, to improve the light- and weather resistance of finished objects made of PVC by coextrusion of a coating layer of a methyl methacrylate homo- or copolymer. In this way, the surface of the finished objects is modified and the good characteristics of polymethyl methacrylate are imparted thereto, insofar as its high gloss, its high weather resistance and its excellent optical characteristics are concerned.

It is also known, especially from German Patent Application DE-A-2,536,461, to produce impact-resistant multilayer composites comprising at least two thermoplastic materials of different impact strength by drawing the composite biaxially at a temperature above the softening point of the materials in question, but at which at least the material which has the lower impact strength is in the thermoelastic state. The material of higher impact strength is, in particular, PVC, while the other one, with good weather resistance, is, in particular, polymethyl methacrylate. The temperature of orientation of the multilayer composite lies in the range 120°–150° C.

The disadvantage of these high orientation temperatures is that the ability of PVC to elongate is low and that the chain relaxation rate is high, with the result that it is not possible to obtain elongations which are sufficient to produce an orientation permitting the final mechanical characteristics to be appreciably improved. In fact, in these conditions, only an elongation of the order of 30% can be obtained by biaxial drawing in the case of PVC, and this is inadequate to produce a sufficient final orientation. The optimum of the temperature of orientation of PVC lies, in fact, in the range of 95°–105° C., close to the glass transition temperature of PVC (85° C.), at which temperature the elongations of PVC is higher than 70 % when drawn biaxially.

SUMMARY OF THE INVENTION

The objective of the present invention is to provide biaxially oriented rigid thermoplastic structures, comprising a layer of vinyl chloride polymer and a coating layer of polymethyl methacrylate containing products absorbing ultraviolet radiation, permitting a molecular biaxial orientation in the range 95°–110° C.

To this end, the present invention relates to biaxially oriented rigid thermoplastic structures with multiple coextruded polymeric layers comprising a layer of vinyl chloride polymer and a coating layer of polymethyl methacrylate containing products absorbing ultraviolet radiation, which are characterized in that the coating layer of polymethyl methacrylate contains products absorbing ultraviolet radiation in sufficient quantity to bring the glass transition temperature of this layer to a value not exceeding 105° C. In general, this objective is attained by incorporating from 3 to 7 % by weight of products absorbing ultraviolet radiation into the coating layer, this being relative to the weight of this layer.

DESCRIPTION OF THE PREFERRED EMBODIMENTS

The glass transition temperature is evaluated by measurements of the dynamic mechanical properties of the polymers from the glass state to the molten state according to the ASTM standard D4065 (or the equivalents, ISO standard 537 and DIN standard 53445). The measurement consists in determining the dynamic elastic modulus $G'$ and the loss modulus $G''$ as a function of temperature at a frequency F of 0.1 cycle per second or an impulse frequency of $0.6 \text{ s}^{-1}$. The loss factor $\tan \delta$ is calculated from the ratio $G''/G'$. The glass transition temperature is the temperature at which the loss factor is a maximum.

Vinyl chloride polymers mean vinyl chloride homo- and copolymers, the latter containing at least 50% by weight of units derived from. vinyl chloride and at least one monomer capable of being copolymerized with vinyl chloride. The copolymerizable monomers are those generally employed in the conventional techniques for copolymerizing vinyl chloride. By way of examples, there may be mentioned vinyl esters of mono- and polycarboxylic acids, such as vinyl acetate, propionate and benzoate, unsaturated mono- and polycarboxylic acids such as acrylic, methacrylic, maleic, fumaric and itaconic acids, and their aliphatic, cycloaliphatic and aromatic esters, their amides and their nitriles, alkyl, vinyl and vinylidene halides, and alkyl vinyl ethers. The vinyl chloride polymers employed within the scope of the present invention are preferably vinyl chloride homopolymers.

Polymethyl methacrylate means methyl methacrylate homo- and copolymers, the latter containing at least 80% by weight of methyl methacrylate and at least one monomer capable of being copolymerized with methyl methacrylate. The copolymerizable monomers are those generally employed in the conventional techniques for copolymerizing methyl methacrylate. Methyl acrylate, ethyl acrylate, propyl acrylate and butyl acrylate may be mentioned by way of examples. The polymethyl methacrylate employed within the scope of the present invention is preferably methyl methacrylate homopolymer.

The products absorbing ultraviolet radiation which can be employed according to the present invention are, for example, benzophenone compounds such as the following: 2,4-dihydroxybenzophenone, 2-hydroxy-4-methoxybenzophenone, 2,2,'-dihydroxy-4-methoxybenzophenone, 2,2,'-dihydroxy-4,4,-dimethoxybenzophenone, 2-hydroxy-4-n-octoxybenzophenone and 2-hydroxy-4-isooctoxybenzophe-none; benzotriazole compounds such as the following: 2-(2'-hydroxy-5'-methylphenyl)benzotriazole, 2-(3',5'-di-t-butyl-2'-hydroxyphenyl)-5-chlorobenzotriazole, 2-(3'-t-butyl-2'-hydroxy-5'-methylphenyl)-5-chlorobenzotriazole, 2-(2'-hydroxy-3',5'-di-t-butylphenyl)benzotriazole, 2-(2'-hydroxy-3',5'-di-t-amylphenyl)benzotriazole and 2-(2'- hydroxy-5'-t-octylphenyl)benzotriazole; and substituted oxanilide compounds such as N,N'-(2-ethyl-2'-ethoxyphenyl)oxanilide. The products absorbing ultraviolet radiation which are preferred within the scope of the invention are benzophenone compounds and, more particularly, 2-hydroxy-4-methoxybenzophenone.

In addition to the products absorbing ultraviolet radiation in the coating layer, the thermoplastic materials which can be employed according to the present invention may contain other conventional additives such as stabilizers, lubricants, antistatic agents, fillers, pigments, colorants, flame-retardants, internal lubricants, and the like.

The biaxially oriented rigid thermoplastic structures according to the invention may be produced by coextrusion followed by an orientation treatment along one or two axes. To produce the said structures before orientation it is possible to make use of the usual techniques of coextrusion through a flat or circular die, of feedblock or multimanifold type. Nevertheless, preference is given to multilayer structures coextruded through a feedblock die and still more particularly through a flat die with a feedblock. To produce the orientation of the said structures after coextrusion it is possible to make use of the usual known techniques of monoaxial or biaxial drawing, preference being given to the biaxial drawing techniques such as biaxial drawing by extension or inflation in an annular matrix, simultaneous biaxial drawing in a T matrix, or sequential two-stage biaxial drawing. In this case, the draw ratio is preferably higher than 50%. The drawing conditions are chosen so as to orient the macromolecules as much as possible and to preserve a sufficient degree of orientation in the finished material. To do this, traction must be applied to the material at a high rate, followed by a rapid cooling of the drawn material, as soon as the drawing is finished.

The drawing rates are normally between 200 and 1000%/min.

The thickness of the polymer layers forming part of the multilayer composites according to the invention and the total thickness of the said structures are not critical and obviously depend on the use for which they are intended. However, it is generally preferred that the total thickness of the said structures after drawing should be between 0.3 and 3 mm and preferably between 0.5 and 1.5 mm. Since the coating layer is made of a material which is substantially more costly than PVC, efforts are made not to make it too thick, so that thicknesses of the coating layer which lie between 1 and 10% of the thickness of the PVC layer are advantageously provided. The coating layer may be deposited over the whole periphery of the multilayer rigid structures or on a part of the periphery of the said structures, and preferably on the part of the periphery which is intended to be exposed to the action of the atmospheric agents.

The mixtures of polymethyl methacrylate and of products absorbing ultraviolet radiation may be prepared according to any known mixing techniques, the ingredients being in the solid state or in the molten state. To ensure the homogeneity of the mixtures and good dispersion of the constituents in the polymethyl methacrylate, a blending operation is generally performed in the temperature region corresponding to the viscoelastic state of the polymer.

The blending may be performed by any means which is known for this purpose. Thus, it is possible to work equally well in blenders of the external type or of the internal type. Blenders of the internal type are preferred, and more particularly extruders, which form a particular class of internal blenders. The blending may be carried out under the usual conditions which are well known to a person skilled in the art.

The blending temperature is not critical and is determined by the nature and the decomposition temperatures of the ingredients. The work is generally carried out at temperatures not exceeding 250° C.

The blending time is chosen with due regard to the nature of the polymethyl methacrylate and of the temperature applied. This time is generally between 5 seconds and 20 minutes and in most cases between 10 seconds and 15 minutes. It is preferred to work for periods of between 15 seconds and 10 minutes.

The examples which follow are intended to illustrate the invention without, however, limiting it.

EXAMPLES 1 to 6 and 1R

These examples show the changes in the glass transition temperatures which are produced after blending polymethyl methacrylate (PMMA) with products absorbing ultraviolet radiation according to the invention (Examples 1 to 6). In Examples 1 to 3, 4 grams of agent absorbing ultraviolet radiation are employed per 100 grams of PMMA. In Examples 4 to 6, 7 grams of agent absorbing ultraviolet radiation are employed per 100 grams of PMMA. In Example 1R, given by way of reference, no agent absorbing ultraviolet radiation is incorporated.

The blends of Examples 1 to 6 were prepared with the aid of a Schwabenthan microblender. The bowl temperatures were set to 200° C., the friction ratio to 1.2 and the speed of rotation to 22 revolutions/minute, the gap between the two bowls being set so that the thickness of the crepe formed is between 1 and 1.5 mm. The quantity of material employed was 200 grams and the material was blended for 10 minutes. After cooling, the crepe formed was pressed at 200° C. to obtain a plaque 1.2 mm in thickness. The plaques formed by hot pressing were used for measuring the glass transition temperatures. The measured values of the glass transition temperatures are given as a function of the composition in the table below. The examples differ in the nature and the quantity of agent absorbing ultraviolet radiation in the composition.

| Example | Composition | Glass transition temperature |
|---|---|---|
| 1 | 100 g PMMA + 4 g anti-UVA(1) | 104° C. |
| 2 | 100 g PMMA + 4 g Tinuvin 312(2) | 106° C. |
| 3 | 100 g PMMA + 4 g Tinuvin 320(3) | 109° C. |
| 4 | 100 g PMMA + 7 g anti-UVA | 97° C. |
| 5 | 100 g PMMA + 7 g Tinuvin 312 | 99° C. |
| 6 | 100 g PMMA + 7 g Tinuvin 320 | 104° C. |
| 1R | PMMA(4) | 114° C. |

(1)anti-UVA (trademark of Soc. Fr. Organo Synthese) is 2-hydroxy-4-methoxybenzophenone
(2)Tinuvin 312 (trademark - Ciba-Geigy) is N',N'.-(2-ethyl-2'-ethoxyphenyl)oxanilide
(3)Tinuvin 320 (trademark - Ciba-Giegy) is 2-(2'-hydroxy-3',5'-di-tert-butylphenyl)-benzotriazole
(4)PMMA is polymethyl methacrylate grade TD542 (trademark - Imperial Chemical Industries Ltd)

The elongation at 105° C. of the products obtained in Example 1 to 3 and 1R, according to ISO standard 527, gave the following values:

| Example | Elongation at break |
| --- | --- |
| 1 | 448% |
| 2 | 314% |
| 3 | 278% |
| 1R | 242% |

A very high elongation at break is found for the composition according to Example 1, which is highly favourable for the biaxial orientation process.

EXAMPLES 7 and 2R

These examples show the differences in the biaxial orientation behaviour which are produced when starting with the multilayer rigid structures according to the invention. In example 2R, given by way of reference, no agent absorbing ultraviolet radiation is incorporated in the coating layer.

To manufacture the coextruded structures according to Examples 7 and 2R, two extruders A and B are employed, feeding a feedblock which itself feeds a flat die 30 cm in width, the temperature of the PVC leaving the extruder being 205° C. and that of the coating layer being 220° C. The PVC is a vinyl chloride homopolymer which has a K value of 64 and is stabilized with tin.

The feedblock is temperature-controlled at 180° C. The flat die is temperature-controlled at 195° C.

The exit opening of the flat die is set so that the total thickness of the flat coextruded structure is equal to 3.6 mm and that the thickness of the coating layer is equal to 120 μm.

After cooling to ambient temperature, a plaque with a surface area of 300×300 mm was cut out carefully with a well-sharpened knife. The cut-out plaque was then placed in position in a Bruckner-Karo stenter, the plaque being held in position by clamping its edges between the stenter clamps.

The plaque is then heated with hot air controlled at the desired drawing temperature. After temperature-conditioning, the plaque is then drawn biaxially by moving the stenter clamps to twice their initial distances in both perpendicular directions. The drawing rate is 550%/min. The biaxially drawn plaque, with a draw ratio of 80% in both directions in its central part, is then cooled and released from the clamps.

The behaviour of the multilayer rigid structures according to the invention and according to the Comparison Example 2R when biaxially oriented at 105° C. is given in the following table.

A good drawing behaviour means that the plaque is drawn biaxially as far as the imposed conditions.

On the other hand, poor drawing behaviour means that the plaque tears during the imposed biaxial orientation test.

| Example | Composition of the coating layer | Glass transition temperature | Drawing behaviour |
| --- | --- | --- | --- |
| 7 | 100 g PMMA + 4 g anti-UVA | 104° C. | Good |
| 2R | PMMA | 114° C. | Bad |

These results clearly show that the glass transition temperature value equal to or lower than 105° C. (Example 7) for the coating layer is necessary to obtain a good drawing behaviour.

Tensile resilience, measured according to DIN standard 53448, of the product obtained according to Example 7 is 330 kJ/x$^2$ before biaxial orientation, up to 1150 kJ/m$^2$ after biaxial orientation. This latter value is very close to the tensile resilience of biaxially oriented PVC plaques, which is of the order of 1250 kJ/m$^2$. The optimum value of tensile resilience obtained for the product according to Example 2R is 270 kJ/m$^2$. This optimum value is obtained by biaxial orientation at 125° C.

These results clearly show the advantage of the biaxially oriented rigid thermoplastic structures according to the invention.

What is claimed is:

1. Biaxially oriented, rigid thermoplastic structure, comprising:
   multiple coextruded polymeric layers comprised of a layer of vinyl chloride polymer, and a coating layer of polymethyl methacrylate provided on the layer of vinyl chloride polymer and containing at least one substance which absorbs ultraviolet radiation in a quantity effective to provide a glass transition temperature for the coating layer which does not exceed 105° C.

2. The biaxially oriented, rigid thermoplastic structure according to claim 1, wherein the at least one substance which absorbs ultraviolet radiation is selected from the group consisting of benzophenone and benzotriazole compounds.

3. The biaxially oriented, rigid thermoplastic structure according to claim 1, wherein the at least one substance which absorbs ultraviolet radiation is 2-hydroxy-4-methoxy-benzophenone.

4. The biaxially oriented, rigid thermoplastic structure according to claim 1, wherein from 3 to 7% by weight of the at least one substance which absorbs ultraviolet radiation are incorporated into the coating layer, relative to the weight of the coating layer.

5. The biaxially oriented, rigid thermoplastic structure according to claim 1, wherein the coating layer and the layer of vinyl chloride polymer have respective thickness, and wherein the thickness of the coating layer ranges from 1 to 10% of the thickness of the layer of vinyl chloride polymer.

6. The biaxially oriented, rigid thermoplastic structure according to claim 1, wherein the biaxially oriented, rigid thermoplastic structure has a biaxial draw ratio which is higher than 50%.

7. The biaxially oriented, rigid thermoplastic structure according to claim 1, which is coextruded through a feedblock die and a post-orientation.

8. The biaxially oriented, rigid thermoplastic structure according to claim 1, which is coextruded through a flat die with a feedblock and a post-orientation.

* * * * *